United States Patent
Ottosson

(10) Patent No.: US 8,919,290 B2
(45) Date of Patent: Dec. 30, 2014

(54) MOTIVATIONAL TOY FOR A PET

(75) Inventor: Nina Ottosson, Kiriskoga (SE)

(73) Assignee: Zoo Active Products Ottosson Legoindustri AB, Karlskoga (SE)

( * ) Notice: Subject to any disclaimer, the term of this patent is extended or adjusted under 35 U.S.C. 154(b) by 0 days.

(21) Appl. No.: 13/639,101

(22) PCT Filed: Apr. 6, 2011

(86) PCT No.: PCT/SE2011/050414
§ 371 (c)(1),
(2), (4) Date: Oct. 3, 2012

(87) PCT Pub. No.: WO2011/142707
PCT Pub. Date: Nov. 17, 2011

(65) Prior Publication Data
US 2013/0025543 A1    Jan. 31, 2013

(30) Foreign Application Priority Data
May 11, 2010  (SE) .................................. 1050464-5

(51) Int. Cl.
*A01K 29/00* (2006.01)
*A01K 15/02* (2006.01)
*A01K 5/01* (2006.01)

(52) U.S. Cl.
CPC ............. *A01K 15/025* (2013.01); *A01K 5/0114* (2013.01)
USPC ........................................................ 119/707

(58) Field of Classification Search
CPC .......................... A01K 15/025; A01K 5/0114
USPC ............. 119/702, 707, 709, 710, 711, 51.01, 119/61.2
See application file for complete search history.

(56) References Cited

U.S. PATENT DOCUMENTS 600,696 A * 3/1898 Patterson ........................ 273/113
2,942,379 A * 6/1960 Oman et al. ................... 446/149
(Continued)

FOREIGN PATENT DOCUMENTS

DE    20 2006 011458 U1    10/2006
WO        2007/149318 A2    12/2007
WO        2011/110596 A2     9/2011

OTHER PUBLICATIONS

International Search Report and Written Opinion issued PCT/SE201/050414, Aug. 15, 2011.

(Continued)

*Primary Examiner* — Rob Swiatek
*Assistant Examiner* — Ebony Evans
(74) *Attorney, Agent, or Firm* — Jeffrey S. Melcher; Manelli Selter PLLC

(57) ABSTRACT

The present invention relates to a toy for motivating or training a pet, comprising a first outer shell section (2) and a second outer shell section (2'), said first and second shell sections (2,2') being arranged to create a space between themselves, and further comprising an entry opening (21, 21'), preferably comprising a raised section (29, 29') that extends into said space, and said toy also comprising at least one exit opening (22-24'), each of said entry and exit openings (22-24') being arranged to connect said space to a surrounding of said toy (1), characterized in said toy (1) being arranged to provide at least two different paths through said space from said entry opening (21, 21') to said exit opening (22-24'), said at least two paths being provided by means of at least one ridge (32), preferably fixed to said shell section (2, 2'), said ridge defining a limited transversal opening, wherein said ridge (32) and opening respectively are arranged to provide a maze like path for transversal movement of an object from said entry opening (21, 21') to said exit opening (22-24'). The invention also relates to a method for motivating or training a pet using a toy.

20 Claims, 3 Drawing Sheets

(56) References Cited

U.S. PATENT DOCUMENTS

| | | | | |
|---|---|---|---|---|
| 2,975,547 | A | * | 3/1961 | Greve .............................. 446/77 |
| 4,008,526 | A | * | 2/1977 | Swett et al. ................... 434/259 |
| 4,451,038 | A | * | 5/1984 | Nagy ............................. 273/110 |
| 4,570,935 | A | * | 2/1986 | Stefanini ................... 273/153 R |
| 4,890,838 | A | * | 1/1990 | Rudell et al. ............... 273/138.1 |
| 5,009,193 | A | | 4/1991 | Gordon |
| 5,310,184 | A | * | 5/1994 | Grist ........................ 273/153 R |
| 5,758,604 | A | | 6/1998 | Jorgensen |
| 6,073,581 | A | * | 6/2000 | Wang ......................... 119/51.01 |
| 7,367,283 | B2 | * | 5/2008 | Aboujaoude et al. ......... 119/707 |
| D652,447 | S | * | 1/2012 | Knox, Jr. ......................... D19/2 |
| 8,225,747 | B2 | * | 7/2012 | Markham et al. .......... 119/51.01 |
| 2006/0254531 | A1 | | 11/2006 | Willinger |
| 2007/0022971 | A1 | | 2/2007 | Renforth |
| 2007/0289553 | A1 | | 12/2007 | Jager |
| 2011/0226187 | A1 | * | 9/2011 | Bertsch ...................... 119/61.55 |
| 2013/0061816 | A1 | * | 3/2013 | Aboujaoude ................. 119/707 |

OTHER PUBLICATIONS

Supplementary European Search Report, issued in European Patent Application No. 11780881.6, Aug. 21, 2014, pp. 1-8.

\* cited by examiner

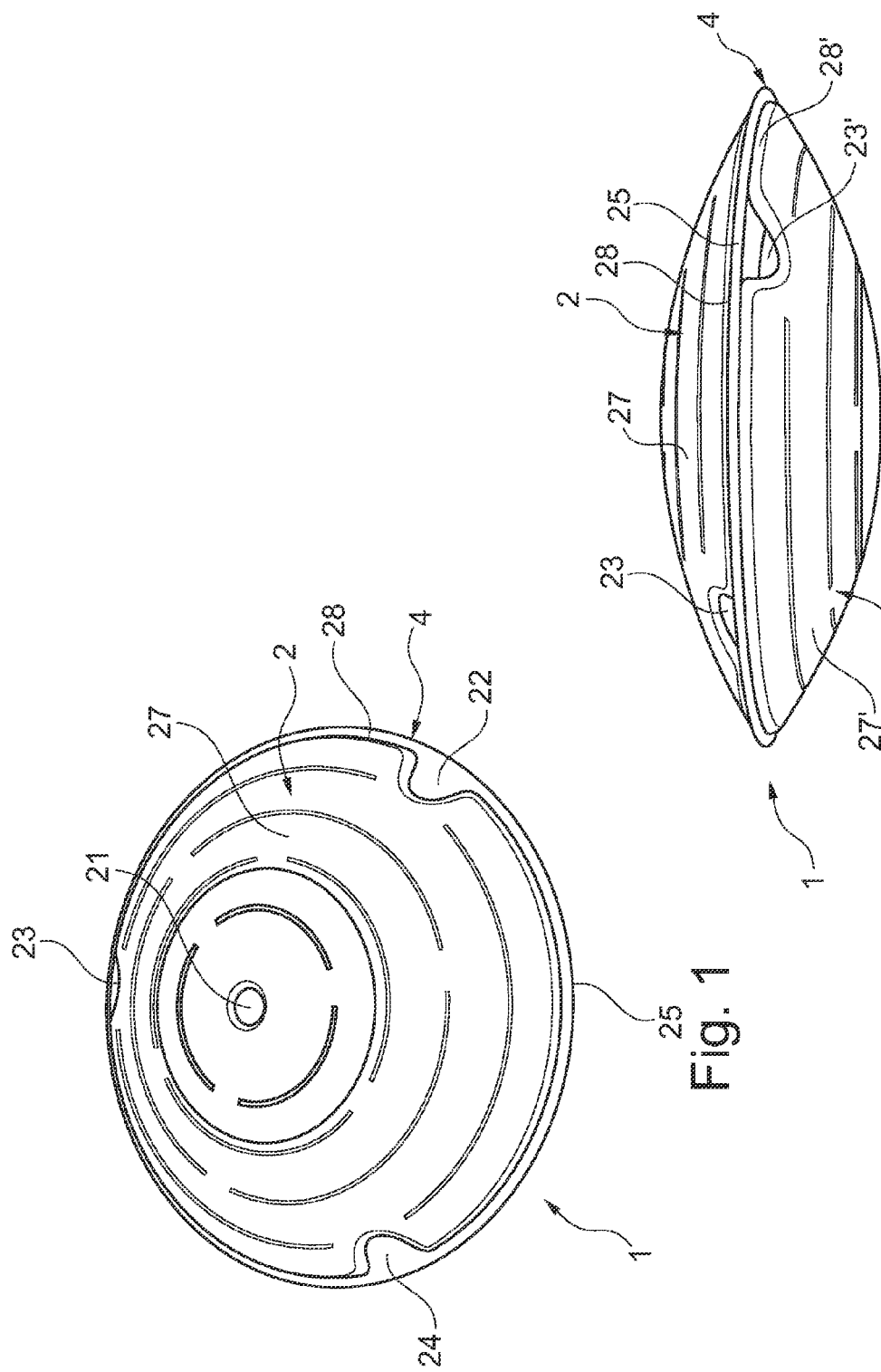

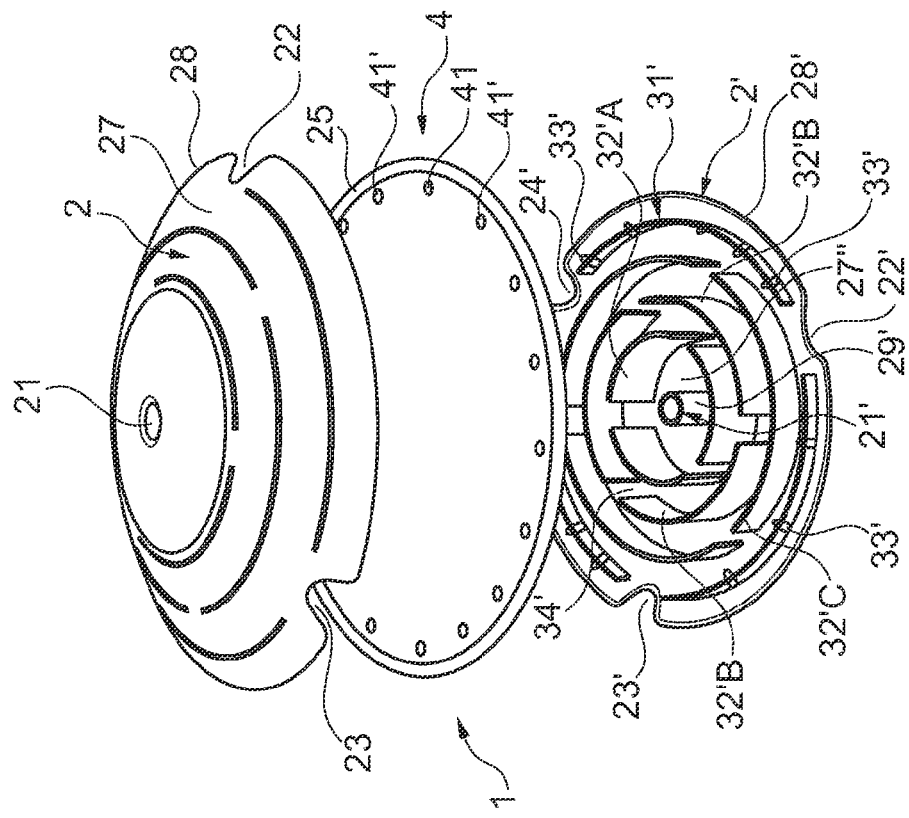
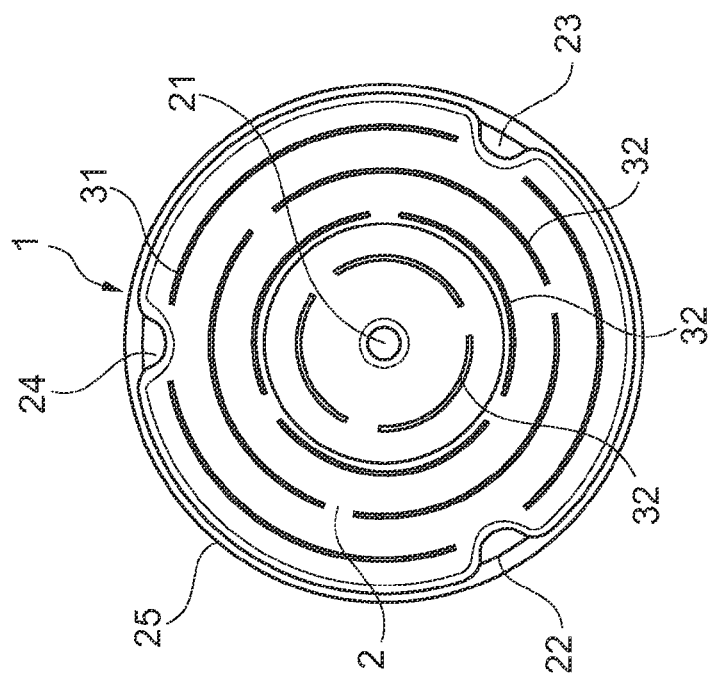
Fig. 3
Fig. 4

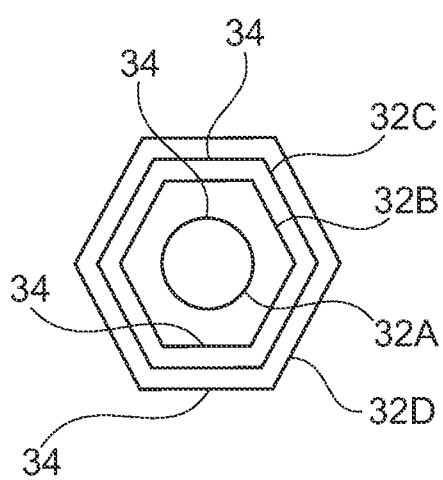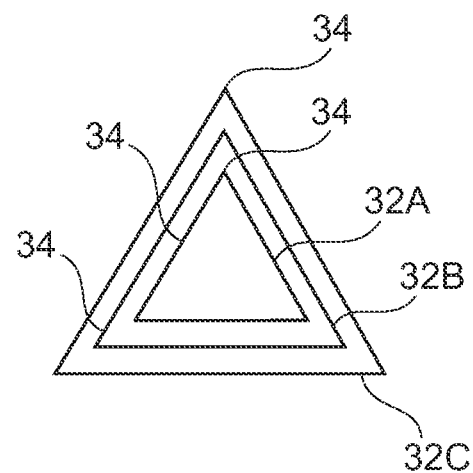
Fig. 5A          Fig. 5B
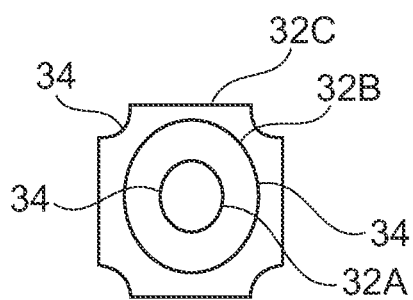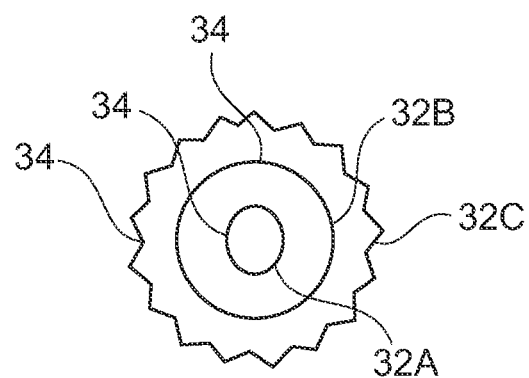
Fig. 5C          Fig. 5D

MOTIVATIONAL TOY FOR A PET

TECHNICAL FIELD

The present invention relates to a toy for motivating or training a pet, comprising a first outer shell section and a second outer shell section, said first and second shell sections being arranged to create a space between themselves, and further comprising an entry opening and at least one exit opening, each of said entry and exit openings being arranged to connect said space to a surrounding of said toy. The invention also relates to a method for motivating or training a pet.

BACKGROUND ART

The training of pets such as dogs or cats is a popular hobby or profession, but the proper tools for performing such training have been known to be scarce and/or suffering from lack of suitability for the pets in question. One known form of training, especially popular for training dogs but also suitable for other types of animals, is a toy where a number of treats are placed into an opening and the pet by manipulating the toy can make the treats appear again through another opening and thereby receive a reward for playing with the toy.

One such toy is known from U.S. Pat. No. 5,758,604, where a cubic toy has an entry opening for insertion of a treat and an internal spiral shaped path that leads to an exit opening on a side of the cube that is directly opposite that of the entry opening. This toy is, however, difficult to manoeuvre by the pet due to its shape and does not in the long run stimulate the pet enough.

Another toy is shown by WO2007149318, where the same basic principle is applied to a toy of a rounded shape that can be more easily handled by a pet for allowing a treat to slide along a spiral shaped path. The challenge to the pet is, however, limited since practically any kind of manipulation of the toy will result in the treat emerging from the exit opening. Rather than learning a technique that will give the desired result, the pet has only to pat the toy in a random way until the treat can be reached and eaten, and thanks to gravity the treat could even emerge by its own volition if the friction along the spiral path is low.

It is therefore evident that there is a need for a more stimulating toy for pets that present more of a challenge to the pet while at the same time enabling a clear reward for a desired behaviour.

DISCLOSURE OF THE INVENTION

The object of the present invention is to fulfill the objects set forth above. This is achieved through a toy for motivating or training a pet, according to claim 1.

According to an aspect of the invention said first outer shell section comprises a peripheral outer edge extending in one plane interrupted by at least one cut out forming said exit opening.

According to a further aspect of the invention, at least one outer shell section is arcuate. Thereby, the toy can be more easily manipulated by the pet, resulting in an improved transportation of a treat from an entry opening to an exit opening.

According to another aspect of the invention, said toy comprises at least two exit openings. Thereby, playing with the toy can be made more unpredictable and stimulating to the pet, since there are more than one location where a treat can emerge if the correct way of playing with the toy is employed.

According to a further aspect of the invention, both shell sections are arcuate. Thereby, the playing with the toy can continue even if the toy is turned upside down, since the manipulating of the toy can be performed in a simplified way for the pet.

According to a further aspect of the invention a middle section, preferably flat shaped, is placed between the two shell sections, dividing said space into two halves. In a preferred embodiment said middle section is arranged with first attachment means arranged to allow attachment of at least one, preferably both, of said shell sections by means of second attachment means arranged on said shell section/s, whereby the advantage is obtained that exactly the same production mould may be used for both shell sections, i.e. both shell sections using the same attachment interface in relation to the middle section.

According to yet another aspect of the invention, said toy is arranged onto another toy in such a way that the second outer shell section of a first of the toys also serves as the second outer shell section of the second toy. Thereby, treats can be inserted from two different directions into the toy and can emerge in the different exits of each toy, giving a more complex toy and more possibilities of reward for the pet, since playing with either side can cause the emergence of a treat.

Further advantages will become apparent from the following more detailed description.

BRIEF DESCRIPTION OF THE DRAWINGS

The invention will now be described in more detail with reference to the appended drawings, wherein FIG. 1 shows a perspective view of a toy for a pet according to a preferred embodiment of the invention, FIG. 2 shows a planar view from the side of the toy of FIG. 1, FIG. 3 shows an exploded view of the toy of FIGS. 1 and 2, FIG. 4 shows a planar view from above of the toy of FIG. 1-3, and FIGS. 5A-5D show a variety of possible ridge formations.

DETAILED DESCRIPTION OF THE INVENTION

In FIGS. 1 and 2, a toy 1 for a pet according to a preferred embodiment of the invention can be seen, with a first outer shell section 2, an intermediate flat shaped, circular, wall 4, and a second outer shell section 2, preferably having the same design as the first shell section 2. Each outer shell section 2, 2' comprises a centrally positioned entry opening 21 and a series of peripheral exit openings 22, 23, 24. Thanks to relative sizes of the outer shell sections 2, 2' and the middle section 4, an outer boundary of the middle section 4 in the form of an edge 25 also serves as an outer boundary for the shell sections 2, 2'.

FIG. 2 shows a side view of the toy 1 of FIG. 1, where the first outer shell section 2 along with one of the exit openings 23 is shown mounted onto the middle section 4 with the edge 25. On the opposite side of the middle section 4, the second outer shell section 2' is mounted, in shape and size preferably corresponding to the first outer shell section 2 and thus comprising an entry opening 21' and a number of exit openings 22', 23', 24', one of which is shown in FIG. 2.

It can now be appreciated that the first outer shell section 2 and the second outer shell section 2' are arcuate in shape, i.e. having outer shell portions 27, 27' forming spherical segments, in such a way that they each have an essentially circular circumferential edge 28, 28', wherein the openings 22-24' are formed by means of U-shaped cut outs. Each shell 2, 2' that is mounted onto the middle section 4 from opposite directions and extend symmetrically up- or downwards towards a highest or lowest point placed in the centre of the first and second outer shell section 2, 2'. In this point, the entry openings 21, 21' are placed. When the first and second outer shell sections 2, 2' are mounted onto the middle section 4, a space is created between said middle section 4 and each of the first and second outer shell sections 2, 2'.

FIG. 3 shows an exploded view of the toy 1 of FIGS. 1 and 2, with a first outer shell section 2 showing the entry opening 21 in the centre and two of the exit openings 22, 23 placed at a circumference of the first outer shell section 2. Underneath is the middle section 4 with the edge 25 and a number of mounting holes 41, 41'. Further below, the second outer shell section 2' is shown, with the entry opening 21' placed at the centre and the exit openings 21', 22', 23' around the circumference. Also shown in the space created by the arcuate shape of the outer shell portions 27, 27' are a plurality of ridges 32' that are provided on an inside of said outer shell portions 27, 27' extending, substantially in level with the circumferential edge 28' to essentially abut against a surface of the middle section 4 when the second outer shell section 2' is mounted onto said middle section 4. The entry opening 21' comprises a raised section 29', for instance in the form of a tube shaped portion 29', that extends into the inner space, a shorter distance than the ridges 32', to terminate at a distance from the middle section 4. The ridges 32' are preferably formed by means of a plurality of concentric ring segments 32'A-32'C, one inner group 32'A at a first radius comprising three segments 32'A with opening 34' in between, etc. The first shell section preferably is designed in exactly the same way, and therefore in the following merely the second shell section 2' is described in more detail.

Said ridges 32' together form a maze pattern that is distributed in the space between the middle section 4 and the second outer shell section 2' in such a way that at least one path is available from the entry opening 21' to each of the exit openings 22', 23', 24', preferably a plurality of paths to each of the exit openings 22', 23', 24'. Also shown on the surface of the second outer shell section 2' is a mounting ridge 31' with a plurality of pins (not shown) that are arranged to fit into every second mounting hole 41' of the middle section 4. When mounting the second outer shell section 2' onto the middle section 4, the pins are simply inserted into the mounting holes 41 to make the second outer shell section 2' fit directly onto the middle section 4.

It is to be understood that the first outer shell section 2 has a similar configuration to that shown and described with reference to the second outer shell section 2' and can be mounted onto the other side of the middle section 4 in a similar manner, by means of having its pins (not shown) fitting into some of the available holes 41. Accordingly the middle section preferably is arranged with at least two times the number of holes 41, 41' with regard to the number of pins 41 and 41' respectively on each section 2, 2'. The resulting toy 1 is shown from above in FIG. 4 and illustrates the principle of a single entry opening 21 and a plurality of exit openings 22, 23, 24. The mounting ridge 31 and the ridges 32 may be seen through the outer portion 27 of the first outer shell section 2 in a preferred embodiment thanks to a transparency of the material and serve to illustrate a structure of the maze created inside the toy.

The operation of the toy will now be described with reference to the Figures.

Before a pet such as a dog is allowed to play with the toy 1, a human owner loads a number of small desirable objects such as treats into one or both of the entry openings 21, 21' and places the toy 1 in the vicinity of the pet. The pet can now play with the toy and manipulate it by touching it and turning it in different directions, which will allow the treats inside move around along different paths of the labyrinth until they emerge one by one through any of the exit openings 22, 23, 24, 22', 23', 24'. Thanks to the arcuate shapes of the first and second outer shell sections 2, 2', the pet can easily move the treats along the maze by pushing the toy 1 down by placing a paw onto it or standing on it so that a slope downwards from the entry opening 21, 21' to one of the exit openings 22, 23, 24, 22', 23', 24'. When the toy 1 is left alone it will thanks to its shape resume a position with an entry opening 21, 21' as its lowest point against a floor on which the pet is playing. In this position, the treats may slide back towards the entry opening 21, 21' thus preventing them from falling out of the toy through one of the exit openings 22, 23, 24, 22', 23', 24' if the pet is not actively guiding them towards such an exit, and thanks to a raised section extending from the entry openings 21, 21' and into the interior of the toy 1, an accidental emergence of a treat through the entry openings 21, 21' can also be prevented. Thus, the pet must actively play with the toy 1 in order to dislodge a treat and eat it, and this further increases a motivational effect of the toy 1.

Thanks to its symmetrical shape, the toy 1 can still be played with if it should be placed upside down and there are treats in both mazes, and thereby the pet does not need a human to help with correcting the position of the toy 1 but can keep playing uninterrupted.

The toy 1 is preferably made from an essentially unflexible material such as a hard plastic, for instance a PP plastic, in order to allow for easy cleaning and good durability. The edge 25, the outer circumference of the first and second outer shell sections 2, 2' along with an area around the entry openings 21, 21' can be made from a softer plastic material such as a TPE plastic to allow for a noise reduction as the pet plays with the toy 1 on a hard floor and the like. It is to be noted, however, that many other materials can also be suitable for construction of the toy 1, such as other types of plastics, rubber or metal. Combinations of materials, such as parts of the toy 1 comprising one material and other parts comprising another can also be suitable.

The shape of the toy 1 can be adapted according to the needs and preferences of any particular pet or type of pets. Suitable shapes include those with a circular edge, such as the preferred embodiment described above, but also elliptical, triangular, quadratic, pentagonal and octagonal edge, for instance. In FIGS. 5A-5D there is shown a plurality of different possible designs of the ridges 32, wherein is indicated that by varying the form of the ridges and the number of (preferably concentric) ridge formations 32A-32D the complexity of the toy may be varied within a wide range.

One suitable size for a toy 1 is with a diameter of 20-30 cm, preferably about 23-27 cm, more preferably 24-26 cm of the middle section 4 and a height of 5-15 cm, preferably about 7-12 cm, more preferably 8-10 cm from the entry opening 21 of the first outer shell section 2 to the entry opening 21' of the second outer shell section 2'. Suitable sizes for the entry and exit openings can be a radius of 1-3 cm, more preferably about 2 cm for the entry opening 21 and a width of 1-5 cm, preferably 2-4 cm, more preferably 3 cm and depth of 1-4 cm, preferably 2-3 cm, more preferably 2,5 cm for each of the exit openings 22, 23, 24. The sizes of the openings 21, 22, 23, 24 can be adapted to fit different types of treats for the pet, so that treats commercially available on different markets and for different types of animals can be used with the toy 1. It is important to prevent treats from getting stuck inside the toy 1, so therefore it can be beneficial to design the exit openings 22, 23, 24 to be larger than the entry opening 21, to ensure that anything that can be put into the toy 1 can also be let out through the exit openings 22, 23, 24. For the same reason, it can be beneficial for the openings in the maze inside the toy 1 to be adapted to let larger objects through than can be inserted through the entry opening 21.

In an alternative embodiment a connection between the two mazes created by the ridges 32, 32' can be conceived, as well as a removal of the middle section 4 so that only one maze is available inside the toy 1. Conversely, three or more mazes can be constructed inside the toy 1 to further increase the level of difficulty to the pet, and the number of entry and exit openings can be varied according to the requirements of specific pets.

In another alternative embodiment, one of the outer shell sections 2, 2' can be removed to provide a maze between one outer shell section 2, 2' and the middle section 4, but in this embodiment the pet would not be able to play with the toy 1 if it should be turned with the middle section 4 facing downwards.

The invention is not to be seen as limited by the embodiments described above, but can be varied within the scope of the appended claims, as will become readily apparent to the person skilled in the art. For instance, the toy can comprise only one entry opening and one exit opening, or said entry and exit openings can be one and the same.

The invention claimed is:

1. Toy for motivating or training a pet, comprising:
   a first outer shell section;
   a second outer shell section, said first and second outer shell sections being arranged to create a space therebetween;
   an entry opening;
   at least one exit opening, each of said entry and exit openings being arranged to connect said space to a surrounding of said toy;
   at least one ridge defining a limited transversal opening, wherein said at least one ridge and limited transversal opening respectively are arranged to provide at least one like path for transversal movement of an object from said entry opening to said at least one exit opening; and
   a middle section between the first outer shell section and the second outer shell section, dividing said space into two halves, wherein the first outer shell section and second outer shell section are connected to opposing sides of the middle section, the maze like path being defined between the first outer shell section and the middle section or the second outer shell section and the middle section.

2. The toy according to claim 1, wherein the entry opening comprises a raised section that extends into said space.

3. The toy according to claim 1, wherein the at least one ridge is fixed to said second outer shell section.

4. The toy according to claim 1, comprising at least one ridge formation having a plurality of ridges symmetrically distributed in relation to a symmetry line passing through a center of said toy.

5. The toy according to claim 4, wherein there are arranged at least two of said at least one ridge formation at different distance with respect to the center of said toy.

6. The toy according to claim 1, wherein said first outer shell section comprises a peripheral outer edge extending in one plane interrupted by at least one cut out forming said at least one exit opening.

7. The toy according to claim 6, wherein said first outer shell section comprises an arcuate shell portion.

8. The toy according to claim 7, wherein said second outer shell section comprising an arcuate shell portion.

9. The toy according to claim 1, comprising at least two exit openings.

10. The toy according to claim 9, wherein each of said first and second outer shell sections comprises at least two exit openings.

11. The toy according to claim 1, wherein the middle section is a flat shaped middle section.

12. The toy according to claim 11, wherein said middle section is arranged with a first attachment means arranged to allow attachment of at least one of said first or second outer shell sections by means of a second attachment means arranged on said first or second outer shell section.

13. The toy according to claim 11, wherein said middle section is arranged with first attachment means arranged to allow attachment to both of said first and second outer shell sections by means of second attachment means arranged on said first and second outer shell sections.

14. The toy according to claim 1, said first or second outer shell section comprising a raised section forming an extension of said entry opening into said space and also comprising the at least one ridge also extending into said space, wherein said raised section terminates at a level farther away from a level of the edge of said first or second outer shell section than a termination of said at least one ridge.

15. The toy according to claim 1, said toy being arranged to provide at least two different maze like paths through said space from said entry opening to said at least one exit opening, said maze like paths comprise a first maze like path being defined between the first outer shell section and the middle section and a second maze like path being defined between the second outer shell section and the middle section, said maze like path having a first associated entry opening and a first associated exit opening, and said second maze like path having a second associated entry opening and a second associated exit opening.

16. The toy according to claim 1, wherein the first and second outer shell sections are releasably connected to the middle section so that the first and second outer shell sections can be mounted on either side of the middle section.

17. A method for motivating or training a pet by using a toy, said toy comprising:
   a first outer shell section;
   a second outer shell section, said first and second outer shell sections being arranged to create a space therebetween;
   an entry opening;
   at least one exit opening, each of said entry and exit openings being arranged to connect said space to a surrounding of said toy;
   at least one ridge defining a limited transversal opening;
   a middle section between the first outer shell section and the second outer shell section dividing said space into two halves, wherein said at least one ridge and limited transversal opening respectively are arranged to provide at least one maze like path for transversal movement of an object from said entry opening to said at least one exit openings, said toy is provided with at least two different paths through said space from said entry opening to said exit opening, wherein the first outer shell section and second outer shell section are connected to opposing sides of the middle section, the maze like path being defined between the first outer shell section and the middle section or the second outer shell section and the middle section, the method comprising the steps of:
   placing at least one small object that is appealing to a pet into said entry opening; and
   presenting said toy containing the at least one small object to a pet.

18. The method according to claim 17, wherein the at least one ridge is fixed to said first or second outer shell section.

19. The method according to claim 17, wherein said toy being arranged to provide at least two different maze like paths through said space from said entry opening to said at least one exit opening, said maze like paths comprise a first maze like path being defined between the first outer shell section and the middle section and a second maze like path being defined between the second outer shell section and the middle section, said first maze like path having a first associated entry opening and a first associated exit opening, and said second maze like path having a second associated entry opening and a second associated exit opening, the method further comprising placing a first small object in the first entry opening and a second small object in the second entry opening.

20. The method according to claim 17, wherein the first and second outer shell sections are releasably connected to the middle section so that the first and second outer shell sections can be mounted on either side of the middle section, the method further comprising moving the first and second outer shell sections to different sides of the middle section.

\* \* \* \* \*